United States Patent
Chou et al.

(10) Patent No.: US 12,117,573 B2
(45) Date of Patent: Oct. 15, 2024

(54) HIGH-POWER SEISMIC WAVE EARLY WARNING METHOD AND SYSTEM

(71) Applicant: NATIONAL APPLIED RESEARCH LABORATORIES, Taipei (TW)

(72) Inventors: Chung-Che Chou, Taipei (TW); Shu-Hsien Chao, Taipei (TW); Che-Min Lin, Taipei (TW); Kung-Chun Lu, Taipei (TW); Yu-Tzu Huang, Taipei (TW)

(73) Assignee: NATIONAL APPLIED RESEARCH LABORATORIES, Taipei (TW)

( * ) Notice: Subject to any disclaimer, the term of this patent is extended or adjusted under 35 U.S.C. 154(b) by 360 days.

(21) Appl. No.: 17/809,450

(22) Filed: Jun. 28, 2022

(65) Prior Publication Data

US 2023/0314641 A1    Oct. 5, 2023

(30) Foreign Application Priority Data

Mar. 30, 2022    (TW) ................... 111112228

(51) Int. Cl.
*G01V 1/01*    (2024.01)
*G01V 1/22*    (2006.01)

(52) U.S. Cl.
CPC .............. *G01V 1/01* (2024.01); *G01V 1/22* (2013.01); *G01V 2210/1232* (2013.01); *G01V 2210/65* (2013.01)

(58) Field of Classification Search
CPC .... G01V 1/01; G01V 1/22; G01V 2210/1232; G01V 2210/65
See application file for complete search history.

(56) References Cited

U.S. PATENT DOCUMENTS

| | | | |
|---|---|---|---|
| 9,372,272 B2* | 6/2016 | Price | G08B 21/10 |
| 10,386,510 B2* | 8/2019 | Huang | G01V 1/01 |
| 11,885,921 B2* | 1/2024 | Ziv | G01V 1/288 |

* cited by examiner

*Primary Examiner* — An H Do
(74) *Attorney, Agent, or Firm* — WOMBLE BOND DICKINSON (US) LLP

(57) ABSTRACT

A high-power seismic wave early warning method is provided to use an earliest-arriving seismic wave to estimate a maximum power value of a later-arriving high-power seismic wave for a target site. When the estimated maximum power value of the later-arriving high-power seismic wave is greater than a warning value, an earthquake early warning is transmitted to an earthquake early warning device that is located at the target site.

16 Claims, 3 Drawing Sheets

HIGH-POWER SEISMIC WAVE EARLY WARNING METHOD AND SYSTEM

CROSS-REFERENCE TO RELATED APPLICATION

This application claims priority of Taiwanese Invention Patent Application No. 111112228, filed on Mar. 30, 2022.

FIELD

The disclosure relates to a seismic wave early warning method, and more particularly to a method for early estimation of power of a seismic wave that is to arrive later, so as to timely issue an earthquake early warning if needed.

BACKGROUND

Earthquakes cause seismic waves that have different propagation velocities, so the seismic waves may arrive a site at different time points. Some later-arriving seismic waves have higher power, such as shear waves (also known as S waves), and thus may cause damages to building structures and high-tech equipment. However, conventional earthquake early warning systems can estimate only seismic intensities but not power of seismic waves, so early warnings are issued only for seismic waves that will potentially result in high seismic intensities at the site, and are not issued for seismic waves that will result in low seismic intensities at the site but have high power that would cause damages to building structures and high-tech equipment.

SUMMARY

If the earthquake early warning technology can be developed to estimate the power of high-power seismic waves (such as the above-mentioned later-arriving S-waves) and to issue early warnings accordingly, earthquake-proof and other protective operations may have a chance of being applied to building structures and/or high-tech equipment before the arrival of the high-power seismic waves, so as to reduce disaster losses. Therefore, an object of the disclosure is to provide a high-power seismic wave early warning method that can estimate power of a high-power late-arriving seismic wave (e.g., the S wave), so as to issue early warnings for the high-power late-arriving seismic wave.

According to the disclosure, in one step of the high-power seismic wave early warning method, a power estimation module of a high-power seismic wave early warning system estimates, based on at least one of a seismic wave parameter set that is acquired from a first seismic wave of an earthquake detected at an earthquake detection spot, a source parameter set that is related to the earthquake, or a site parameter set that is related to a target site, a maximum power value of a second seismic wave that will arrive at the target site later than the first seismic wave. The first seismic wave is an earliest one of multiple seismic waves of the earthquake that has arrived at the earthquake detection spot. The seismic wave parameter set includes one of a peak displacement value and a peak power value in first N seconds of the first seismic wave, where N≥1. The source parameter set includes a magnitude scale of the earthquake and a depth of a hypocenter of the earthquake. The site parameter set includes one of a target-site location, shear wave velocity profile data of a soil layer at the target site, and microtremor horizontal-to-vertical (H/V) spectral ratio data at the target site, where the target-site location is represented using a longitude and a latitude of the target site. In one step of the high-power seismic wave early warning method, an early warning module of the high-power seismic wave early warning system generates and transmits an earthquake early warning to an earthquake early warning device that is located at the target site upon determining that the maximum power value of the second seismic wave thus estimated is greater than a warning value.

Another object of the disclosure is to provide a high-power seismic wave early warning system that can estimate power of a high-power late-arriving seismic wave (e.g., the S wave), so as to issue early warnings for the high-power late-arriving seismic wave.

According to the disclosure, the high-power seismic wave early warning system includes a communication interface, a storage unit and a processing unit. The communication interface is configured to communicate with an earthquake early warning device that is located at a target site, and to receive one of wave data of a first seismic wave of an earthquake that is detected at an earthquake detection spot and a source parameter set that is related to the earthquake. The first seismic wave is an earliest one of multiple seismic waves of the earthquake that has arrived at the earthquake detection spot, and the source parameter set includes a magnitude scale of the earthquake and a depth of a hypocenter of the earthquake. The storage unit stores a site parameter set that is related to the target site, and that includes one of a target-site location, shear wave velocity profile data of a soil layer at the target site, and microtremor horizontal-to-vertical (H/V) spectral ratio data at the target site. The target-site location is represented using a longitude and a latitude of the target site. The processing unit is electrically connected to said communication interface and said storage unit, and is configured to acquire a seismic wave parameter set of the first seismic wave upon receipt of the wave data of the first seismic wave, the seismic wave parameter set including one of a peak displacement value and a peak power value in first N seconds of the first seismic wave, where N≥1. The processing unit includes a power estimation module and an early warning module. The power estimation module is configured to, based on at least one of the seismic wave parameter set, the source parameter set and the site parameter set, estimate a maximum power value of a second seismic wave that will arrive at the target site later than the first seismic wave. The early warning module is configured to generate and transmit an earthquake early warning to the earthquake early warning device that is located at the target site upon determining that the maximum power value of the second seismic wave thus estimated is greater than a warning value.

Yet another object of the disclosure is to provide a non-transitory computer-readable medium storing program instructions that, when executed by a computer device of an earthquake early warning system, cause the earthquake early warning system to perform the high-power seismic wave early warning method of this disclosure.

BRIEF DESCRIPTION OF THE DRAWINGS

Other features and advantages of the disclosure will become apparent in the following detailed description of the embodiment(s) with reference to the accompanying drawings, of which.

DETAILED DESCRIPTION

Figure 1:
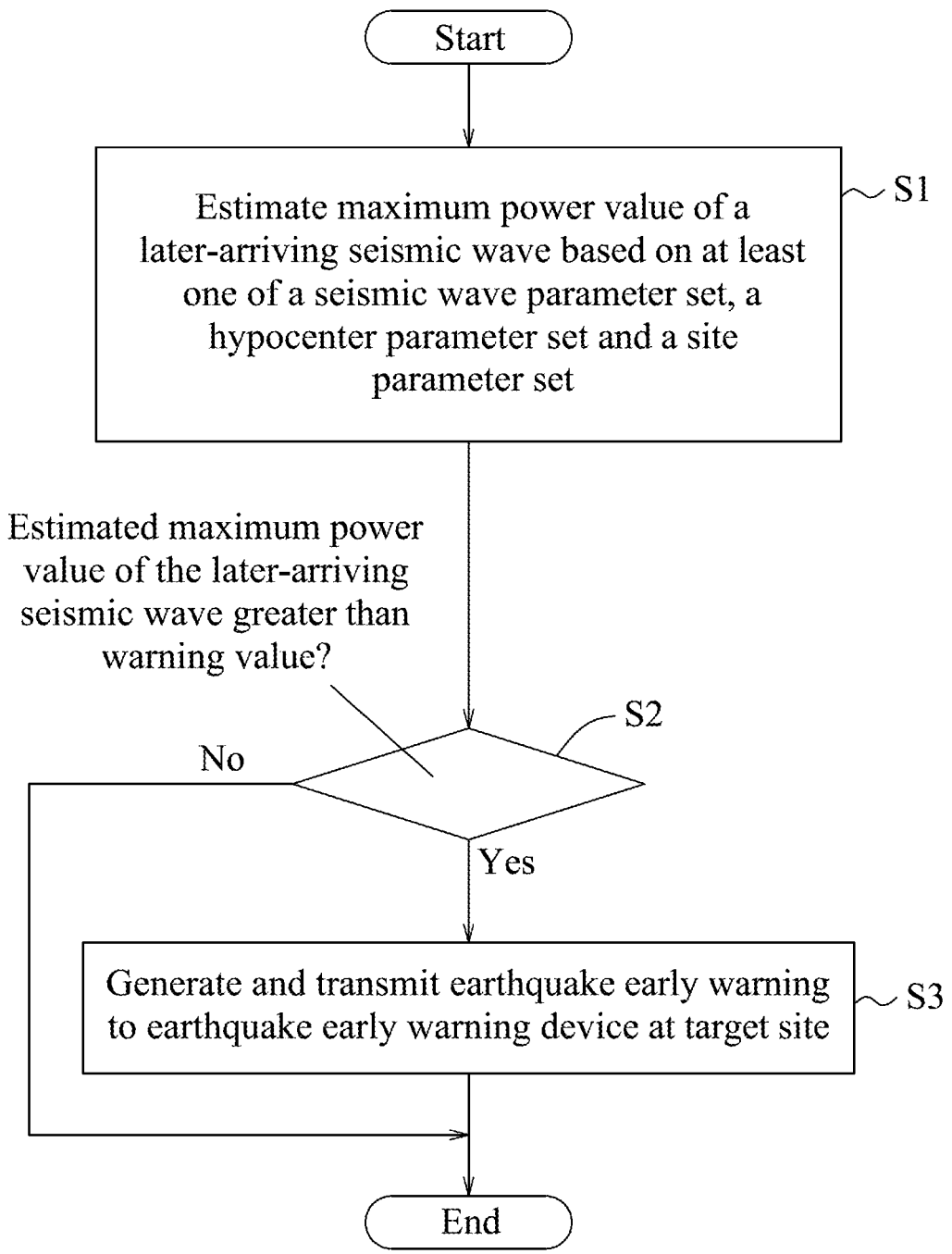
FIG. 1 is a flow chart illustrating steps of an embodiment of a high-power seismic wave early warning method according to the disclosure.

Before the disclosure is described in greater detail, it should be noted that where considered appropriate, reference numerals or terminal portions of reference numerals have been repeated among the figures to indicate corresponding or analogous elements, which may optionally have similar characteristics.

Figure 2:
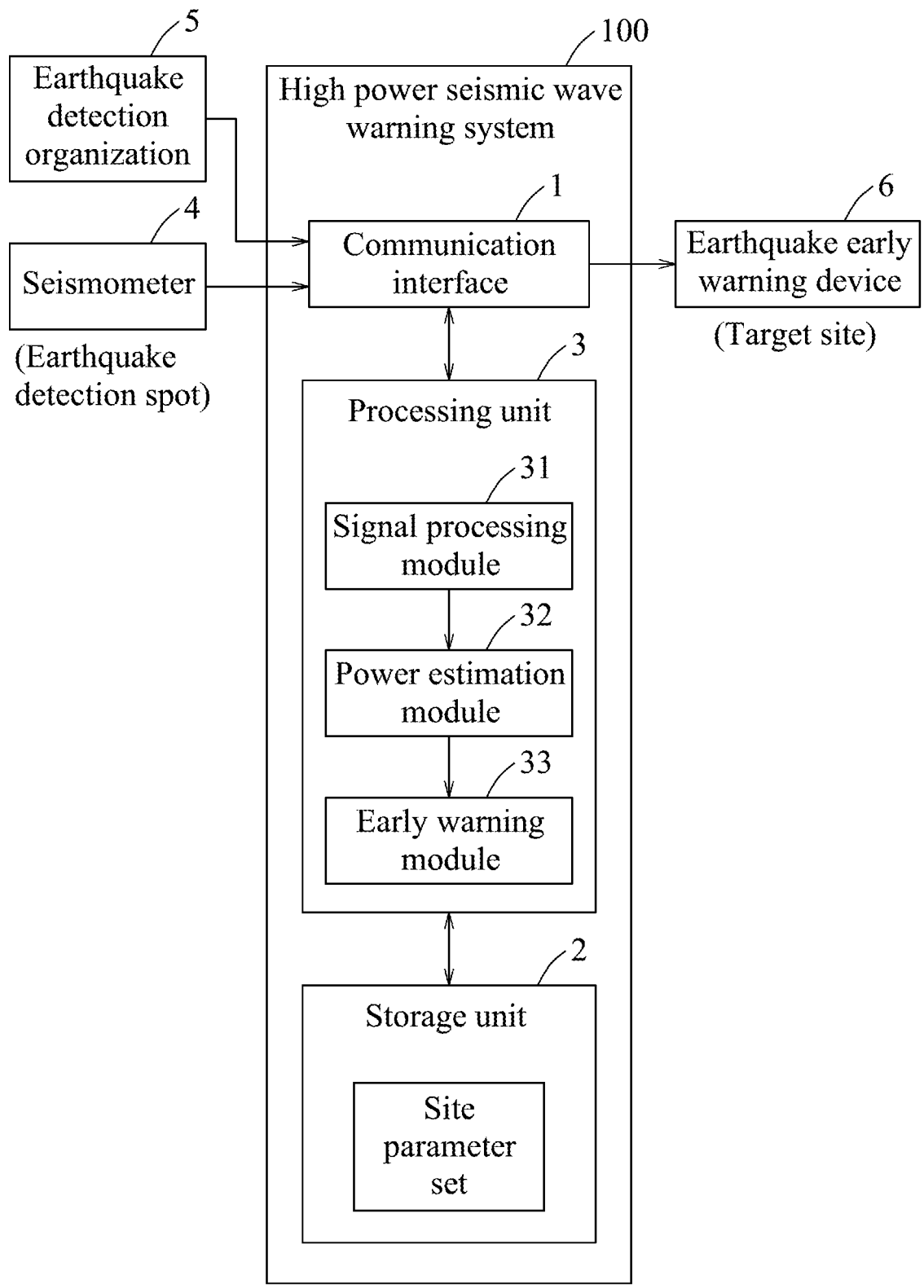
FIG. 2 is a block diagram illustrating an exemplary high-power seismic wave early warning system that implements the embodiment.

Referring to FIG. 1, an embodiment of a high-power seismic wave early warning method according to this disclosure is provided to be implemented by a high-power seismic wave early warning system 100 as illustrated in FIG. 2. The high-power seismic wave early warning system 100 may be constituted by at least one computer device, and includes a communication interface 1, a storage unit 2 (e.g., a non-transitory computer-readable storage medium, such as flash memory, a hard disk drive, a solid state drive, etc.), a processing unit 3 (e.g., a central processing unit, a microcontroller, etc.) that is electrically connected to the communication interface 1 and the storage unit 2, and other components that are required for operation of the computer device(s). The communication interface 1 may be, for example but not limited to, a connection port for connection to another computer device or equipment through physical wires or circuits, or an interface (e.g., a network adapter, a SIM card, etc.) for communication with another computer device or equipment through the Internet or a telecommunication network, so the communication interface 1 is capable of communication with at least one early warning device 6 that is located at at least one target site, and is capable of receiving wave data of an earliest-arriving seismic wave of an earthquake from a seismometer 4 located at an earthquake detection spot (also called a seismograph station), and/or receiving a source parameter set that is related to the earthquake from an earthquake detection organization 5 (e.g., an earthquake information center). The earliest-arriving seismic wave refers to an earliest one of multiple seismic waves of the earthquake that has arrived at the earthquake detection spot, such as the primary wave (also known as the pressure wave), and is referred to as P wave hereinafter. The wave data may, for example but not limited to, indicate a waveform of the earliest-arriving seismic wave (e.g., the P wave). The source parameter set may include a magnitude scale M of the earthquake, a depth D of a hypocenter of the earthquake, and/or an epicenter location $t_e$ that is represented using a longitude and a latitude of an epicenter of the earthquake. In some embodiments, the source parameter set may be directly acquired by the high-power seismic wave early warning system 100, and is not necessarily received from the earthquake detection organization 5, and this disclosure is not limited in this respect.

In addition to the P wave, the seismic waves of the earthquake further include a secondary wave (also known as shear wave, referred to as S wave hereinafter) that will arrive at the earthquake detection spot later than the P wave. The S wave usually has a greater amplitude than the P wave, resulting in higher power than the P wave. The S wave shakes the ground mainly in a horizontal direction, and the resultant lateral forces may damage buildings more easily than vertical forces. As a result, the S wave is more likely to result in seismic damage than the P wave. This embodiment intends to use the wave data of the P wave, the source parameter set, and/or a site parameter set that is related to a target site to estimate a power of the S wave upon arrival at the target site, so as to, if needed, issue an earthquake early warning to an earthquake early warning device 6 that is located at the target site, and thus earthquake-proof and other protective operations may be applied to objects (e.g., buildings, high-tech equipment, etc.) at the target site before the arrival of the S wave, thereby reducing seismic loss.

The storage unit 2 stores, for each target site, the site parameter set that is related to the target site. The site parameter set includes target-site location $t_s$, shear wave velocity profile data of a soil layer at the target site, and/or microtremor horizontal-to-vertical (H/V) spectral ratio data HVRs at the target site, where the target-site location $t_s$ is represented using a longitude and a latitude of the target site. The shear wave velocity profile data of the soil layer at the target site may include, for example but not limited to, an average shear wave velocity $V_{s30}$ for an uppermost 30-meter depth in the soil layer, and/or a depth $Z_{1.0}$ in the soil layer at which a shear wave velocity reaches 1 km/s. The site parameter set may be obtained by performing an on-site geological survey on the target site in advance to occurrence of the earthquake.

The storage unit 2 may further store a software program including program instructions that form a signal processing module 31, a power estimation module 32 and an early warning module 33. When the program instructions are loaded and executed by the processing unit 3, the program instructions cause the high-power seismic wave early warning system 100 to perform the embodiment of this disclosure to estimate, for each of the at least one target site, power of the S wave upon arrival at the target site, so as to determine whether to issue an earthquake early warning for the target site.

After the communication interface 1 transmits the wave data of the P wave received thereby to the processing unit 3, the signal processing module 31 performs signal processing on the wave data to acquire a seismic wave parameter set for the P wave. The seismic wave parameter set may include, for example but not limited to, at least one of a peak displacement value $P_dN$ and a peak power value $P_pN$ in first N seconds of the P wave, where N≥1. In practice, the value N may range between one to five, but this disclosure is not limited in this respect. In some embodiments, the seismic wave parameter set may further include a main period $\tau_cN$ in the first N seconds of the P wave and/or a Fourier amplitude spectrum (FAS) $P_{fs}N$ of an acceleration in the first N seconds of the P wave. The signal processing module 31 is configured to calculate the main period $\tau_cN$, the peak displacement value $P_dN$ and the peak power value $P_pN$ in the first N seconds of the P wave based on a ground displacement time history $d_g(t)$ resulting from the earthquake, a ground velocity time history $v_g(t)$ resulting from the earthquake, and a time $t_p$ the P wave arrived at the earthquake detection spot. The relevant equations may be exemplified as follows:

$$\tau_c N = 2\pi \sqrt{\frac{\int_{t_p}^{t_p+N} d_g(t)^2 dt}{\int_{t_p}^{t_p+N} v_g(t)^2 dt}}$$

$$P_d N = \max\{|d_g(t)|_{t=t_p \sim t_p+N}\},$$

$$P_p N = \max\{P(t)|_{t=t_p \sim t_p+N}\}$$

$$P(t) = \frac{1}{T_w} \int_{t-T_w}^{t} v_{filter}(t)^2 dt$$

where P(t) represents a power value of the seismic waves (including the P wave, S wave, etc.) that varies with time (more particularly the power value of the seismic wave that is present at time "t" or the resultant ground motion at time "t"), $T_w$ represents a time length that is used to calculate the power value P(t), and $v_{filter}(t)$ represents a filtered ground velocity time history $v_g(t)$.

It is noted that, in some cases where the processing unit 3 does not receive the wave data of the P wave from the communication interface 1, the abovementioned signal processing may be omitted, or, in some cases where the high-power seismic wave early warning system 100 is unable to receive the wave data of the P wave right upon arrival of the P wave at the earthquake detection spot, the signal processing module 31 may be omitted.

Referring to FIGS. 1 and 2, in step S1, the power estimation module 32 estimates, for each target site, a maximum power value $P_{max}$ of the S wave based on at least one of the seismic wave parameter set, the source parameter set, or the corresponding site parameter set that is related to the target site (namely, one or more of the three parameter sets).

In step S2, the early warning module 33 determines, for each target site, whether the maximum power value $P_{max}$ of the S wave estimated for the target site is greater than a warning value. When the maximum power value $P_{max}$ of the S wave estimated for the target site is greater than the warning value, the flow goes to step S3 for the target site, where the early warning module 33 generates and transmits an earthquake early warning to the earthquake early warning device 6 that is located at the target site. Otherwise, the flow ends.

When the high-power seismic wave early warning system 100 is an on-site earthquake early warning system that is located at the earthquake detection spot, the at least one target site is the earthquake detection spot (i.e., the high-power seismic wave early warning system 100 is located at the target site), and the high-power seismic wave early warning system 100 may directly and instantly receive the wave data of the P wave from the seismometer 4 that is located at the earthquake detection spot when the earthquake happens. In a case that the power estimation module 32 receives all three of the parameter sets, namely, the seismic wave parameter set, the source parameter set and the site parameter set, the power estimation module 32 may calculate the maximum power value $P_{max}$ of the S wave using, but not limited to, one of the following equations.

$\ln P_{max} = c_1 \ln P_p N + c_2 \ln \tau_c N + c_3 M + c_4 D + c_5 \ln V_{s30} + c_6(P_{fs}N) + c_7(t_s) + c_8(\text{HVRs}) + c_9(t_e) + c_{10}(t_s, t_e) + c_{11}$ $\ln P_{max} = c_1 \ln P_d N + c_2 \ln \tau_c N + c_3 M + c_4 D + c_5 \ln V_{s30} + c_6(P_{fs}N) + c_7(t_s) + c_8(\text{HVRs}) + c_9(t_e) + c_{10}(t_s, t_e) + c_{11}$ It is noted that, in this disclosure, multiple equations will be introduced for estimating the maximum power value $P_{max}$ of the S wave for the at least one target site, and each equation will have an independent set of coefficients $c_i$, where i is a variable which is a positive integer. Namely, for each equation, the coefficients $c_i$ are independent from the coefficients $c_i$ of other equations, although the same number of i may be used in different equations. That is, for the same i, $c_i$ may represent different values in different equations. For each i, the coefficient $c_i$ may be obtained by regression analysis on actually measured time histories of seismic waves of previous earthquakes. In the above equations, the coefficients $c_6$ to $c_{10}$ are functions that can be represented by $c_i(x)$, where x refers to "$P_{fs}N$", "$t_s$", "HVRs", "$t_e$", and "$t_s$, $t_e$", respectively for $c_6$ to $c_{10}$. In this embodiment, the function $c_i(x)$ may be represented as:

$$c_i(x) = \sum_{j=1}^{N_r} d_j \exp\left(-e_j \Delta_{xx_j}^{f_j}\right)$$

where $N_r$ represents a total number of ground motion records of previous earthquakes used for the regression analysis, $x_j$ represents a $j^{th}$ one of the ground motion records (referred to as $j^{th}$ ground motion record hereinafter), $d_j$, $e_j$ and $f_j$ are coefficients, and $\Delta_{xx_j}$ is defined based on the input element x.

When x represents the epicenter location $t_e$, $\Delta_{xx_j}$ represents a distance between an epicenter of the current earthquake and an epicenter as indicated in the $j^{th}$ ground motion record.

When x represents the target-site location $t_s$, $\Delta_{xx_j}$ represents a distance between an earth detection spot of the current earthquake and an earth detection spot as indicated in the $j^{th}$ ground motion record.

When x represents the microtremor H/V spectral ratio data HVRs, $\Delta_{xx_j}$ represents a difference between the microtremor H/V spectral ratio data of the target site and microtremor H/V spectral ratio data of a site as indicated in the $j^{th}$ ground motion record, and may be defined as:

$$\Delta_{xx_j} = \sqrt{\frac{\sum_{k=1}^{n_f} \{\ln(HVR_k) - \ln(HVR_{j,k})\}^6}{n_f}}$$

where $n_f$ represents a total number of frequency points of the microtremor H/V spectral ratio data HVRs, $HVR_k$ represents a microtremor H/V spectral ratio of the target site at a $k^{th}$ one of the frequency points among the $n_f$ frequency points, and $HVR_{j,k}$ represents a microtremor H/V spectral ratio of the site as indicated in the $j^{th}$ ground motion record at the $k^{th}$ one of the frequency points among the $n_f$ frequency points.

When x represents the Fourier amplitude spectrum $P_{fs}N$ of the acceleration in the first N seconds of the P wave, $\Delta_{xx_j}$ represents a difference between the Fourier amplitude spectrum $P_{fs}N$ of the acceleration in the first N seconds of the P wave of the current earthquake and the Fourier amplitude spectrum $P_{fs}N$ of the acceleration in the first N seconds of the P wave as indicated in the $j^{th}$ ground motion record, and may be defined as:

$$\Delta_{xx_j} = \sqrt{\frac{\sum_{k=1}^{n_f} \{\ln(P_{fs}N_k) - \ln(P_{fs}N_{j,k})\}^2}{n_f}}$$

where $n_f$ represents a total number of frequency points of the Fourier amplitude spectrum $P_{fs}N$ of the acceleration in the first N seconds of the P wave, $P_{fs}N_k$ represents a $k^{th}$ one of the frequency points of the Fourier amplitude spectrum $P_{fs}N$ of the acceleration in the first N seconds of the P wave of the current earthquake, and $P_{fs}N_{j,k}$ represents a $k^{th}$ one of the frequency points of the Fourier amplitude spectrum $P_{fs}N$ of the acceleration in the first N seconds of the P wave as indicated in the $j^{th}$ ground motion record.

When x represents a combination of the target-site location and the epicenter location $t_s$, $t_e$, $\Delta_{xx_j}$ represents a sum of the distance between the epicenter of the current earthquake and the epicenter as indicated in the $j^{th}$ ground motion record and the distance between the earth detection spot of the current earthquake and the earth detection spot as indicated in the $j^{th}$ ground motion record.

When the power estimation module 32 is unable to obtain one or more of (1) the Fourier amplitude spectrum $P_{fs}N$ of the acceleration in the first N seconds of the P wave, (2) the target-site location $t_s$, (3) the epicenter location to and (4) the microtremor H/V spectral ratio HVRs, the relevant component(s) may be omitted from the equation for estimating the maximum power value $P_{max}$ of the S wave. In a case that none of the abovementioned four parameters is acquired by the power estimation module 32, the maximum power value $P_{max}$ of the S wave may be estimated using, but not limited to, one of the following equations.

$\ln P_{max}=c_1 \ln P_pN+c_2 \ln \tau_cN+c_3M+c_4D+c_5 \ln V_{s30}+c_6$ $\ln P_{max}=c_1 \ln P_dN+c_2 \ln \tau_cN+c_3M+c_4D+c_5 \ln V_{s30}+c_6$ When the high-power seismic wave early warning system 100 is an on-site earthquake early warning system that is located at the earthquake detection spot (also being the target site), and can obtain only the seismic wave parameter set and the site parameter set, the power estimation module 32 may estimate the maximum power value $P_{max}$ of the S wave using, for example but not limited to, one of the following equations.

$\ln P_{max}=c_1 \ln P_pN+c_2 \ln \tau_cN+c_3(P_{fs}N)+c_3 \ln V_{s30}+c_4 \ln Z_{1.0}+c_5(t_s)+c_6(HVRs)+c_7$ $\ln P_{max}=c_1 \ln P_dN+c_2 \ln \tau_cN+c_3(P_{fs}N)+c_3 \ln V_{s30}+c_4 \ln Z_{1.0}+c_5(t_s)+c_6(HVRs)+c_7$ When the power estimation module 32 is unable to obtain one or more of (1) the target-site location $t_s$, (2) the depth $Z_{1.0}$ in the soil layer at which the shear wave velocity reaches 1 km/s at the target site, and (3) the microtremor H/v spectral ratio data HVRs of the site parameter set that is related to the target site, the relevant component(s) may be omitted from the equation for estimating the maximum power value $P_{max}$ of the S wave. For example, when none of the abovementioned three parameters can be acquired, the power estimation module 32 may calculate the maximum power value $P_{max}$ of the S wave using, for example but not limited to, one of the following equations.

$\ln P_{max}=c_1 \ln P_pN+c_2 \ln \tau_cN+c_3(P_{fs}N)+c_3 \ln V_{s30}+c_4$ $\ln P_{max}=c_1 \ln P_dN+c_2 \ln \tau_cN+(P_{fs}N)+c_3 \ln V_{s30}+c_4$ When the high-power seismic wave early warning system 100 is an on-site earthquake early warning system that is located at the earthquake detection spot (also being the target site), and can obtain only the seismic wave parameter set, the power estimation module 32 may estimate the maximum power value $P_{max}$ of the S wave using, for example but not limited to, one of the following equations.

$\ln P_{max}=c_1 \ln P_pN+c_2 \ln \tau_cN+c_3(P_{fs}N)+c_4$ $\ln P_{max}=c_1 \ln P_dN+c_2 \ln \tau_cN+c_3(P_{fs}N)+c_4$ When the power estimation module 32 is unable to obtain one or both of (I) the main period $\tau_cN$ and (2) the Fourier amplitude spectrum $P_{fs}N$ of the acceleration in the first N seconds of the P wave, the power estimation module 32 may estimate the maximum power value $P_{max}$ of the S wave using, for example but not limited to, one of the following equations.

$\ln P_{max}=c_1 \ln P_pN+c_2$ $\ln P_{max}=c_1 \ln P_dN+c_2$

When the high-power seismic wave early warning system 100 is a regional earthquake early warning system, the storage unit 2 may store a plurality of site parameter sets that are respectively related to multiple target sites, each having an earthquake early warning device 6 located thereat. It is noted that FIG. 2 illustrates only one target site and the corresponding earthquake early warning device 6 for the sake of clarity. The regional earthquake early warning system usually obtains only the source parameter set from the earthquake detection organization 5, and does not obtain the wave data of the P wave and the seismic wave parameter set. In such a scenario, the power estimation module 32 may estimate the maximum power value $P_{max}$ of the S wave for each of the target sites using, for example but not limited to, one of the following equations.

$\ln P_{max} = c_1 + (c_2 + c_3M)\ln\sqrt{R(M, t_e, t_s)^2 + c_4^2} + c_5R(M, t_e, t_s) + c_6M + c_7M^2 + c_8D + c_9\ln V_{s30} + c_{10}\ln(Z_{1.0}) + c_{11}(t_s) + c_{12}(HVRs) + c_{13}(t_e) + c_{14}(t_s, t_e)$ $\ln P_{max} = c_1 + (c_2 + c_3M)\ln(R(M, t_e, t_s) + c_4) + c_5R(M, t_e, t_s) + c_6M + c_7M^2 + c_8D + c_9\ln V_{s30} + c_{10}\ln Z_{1.0} + c_{11}(t_s) + c_{12}(HVRs) + c_{13}(t_e) + c_{14}(t_s, t_e)$ where $R(M, t_e, t_s)$ represents a shortest distance between the target-site location $t_s$ and a fault rupture plane of the earthquake, which can be calculated based on a size of the fault rupture plane that can be estimated using the epicenter location $t_e$ and the magnitude scale M of the earthquake. When the power estimation module 32 is unable to obtain one or more of (1) the target-site location $t_s$, (2) the average shear wave velocity $V_{s30}$ for the uppermost 30-meter depth in the soil layer at the target site, (3) the depth $Z_{1.0}$ in the soil layer at which the shear wave velocity reaches 1 km/s at the target site, and (4) the microtremor H/V spectral ratio HVRs of the site parameter set that is related to the target site, the relevant component(s) may be omitted from the equation for estimating the maximum power value $P_{max}$ of the S wave for the target site. For example, when the power estimation module 32 can obtain, among the abovementioned four parameters, only the depth $Z_{1.0}$ in the soil layer at which the shear wave velocity reaches 1 km/s at the target site and the microtremor H/V spectral ratio HVRs at the target site, the power estimation module 32 may estimate the maximum power value $P_{max}$ of the S wave for the target site using, for example but not limited to, one of the following equations.

$$\ln P_{max} = c_1 + (c_2 + c_3 M) \ln$$
$$\sqrt{R(M,t_e,t_s)^2 + c_4^2} + c_5 R(M,t_e,t_s) + c_6 M + c_7 M^2 + c_8 D + c_9$$
$$\ln V_{s30}$$

$$\ln P_{max} = c_1 + (c_2 + c_3 M) \ln(R(M,t_e,t_s) + c_4) + c_5 R(M,t_e,t_s) +$$
$$c_6 M + c_7 M^2 + c_8 D + c_9 \ln V_{s30}$$

When the high-power seismic wave early warning system 100 is a regional earthquake early warning system and can obtain only the source parameter set and the target-site location $t_s$ of each target site, the power estimation module 32 may calculate the maximum power value $P_{max}$ of the S wave for each target site using, for example but not limited to, one of the following equations.

$$\ln P_{max} = c_1 + (c_2 + c_3 M) \ln$$
$$\sqrt{R(M,t_e,t_s)^2 + c_4^2} + c_5 R(M,t_e,t_s) + c_6 M + c_7 M^2 + c_8 D + c_9(t_e)$$

$$\ln P_{max} = c_1 + (c_2 + c_3 M) \ln(R(M,t_e,t_s) + c_4) + c_5 R(M,t_e,t_s) +$$
$$c_6 M + c_7 M^2 + c_8 D + c_9(t_e)$$

In some cases, the component $c_9(t_e)$ may be omitted from the abovementioned two equations.

It is noted that, when the high-power seismic wave early warning system 100 is a regional earthquake early warning system, the early warning module 33 may, in step S2, determine, for each of the target sites, whether the maximum power value $P_{max}$ of the S wave calculated for the target site is greater than the warning value. When the maximum power values $P_{max}$ of the S wave calculated for the target site is greater than the warning value, the early warning module 33 generates and transmits the earthquake early warning to the earthquake early warning device 6 that is located at the target site in step S3.

Figure 3:
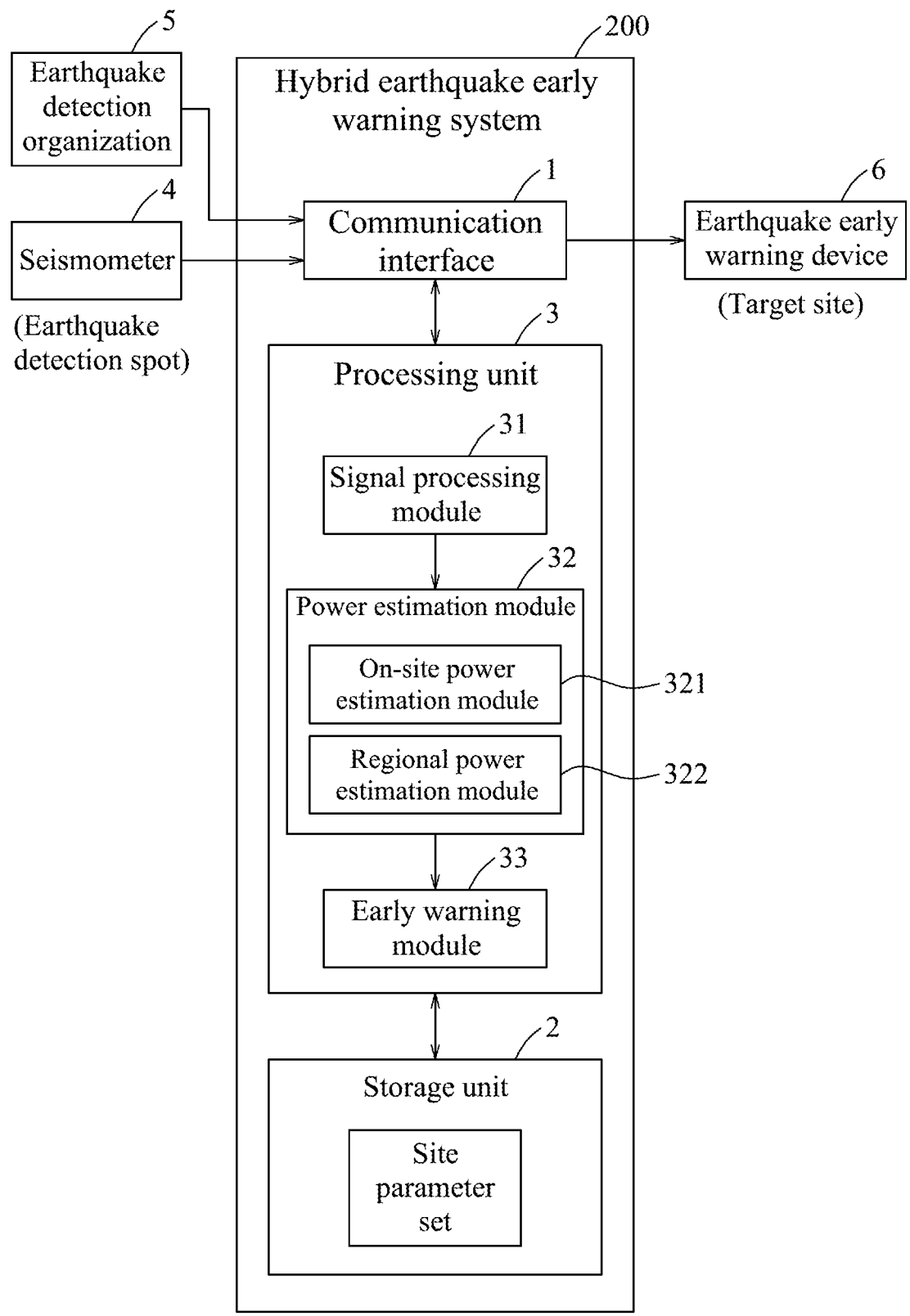
FIG. 3 is a block diagram illustrating a variation of the exemplary high-power seismic wave early warning system.

Referring to FIG. 3, in some embodiments, the high-power seismic wave early warning system 200 may be a hybrid earthquake early warning system that combines the functions of the on-site earthquake early warning system and the regional earthquake early warning system. The hybrid earthquake early warning system is located at the earthquake detection spot, and the target site is the earthquake detection spot. In such a scenario, the high-power seismic wave early warning system 200 can receive the wave data of the P wave through the communication interface 1 from the seismometer 4 that is located at the earthquake detection spot (i.e., the target site in this case), the storage unit 2 stores the site parameter set that is related to the target site, and the power estimation module 32 includes an on-site power estimation module 321 and a regional power estimation module 322.

The on-site power estimation module 321 may be configured to be the same as the power estimation module 32 of the on-site earthquake early warning system, which can use the seismic wave parameter set alone, or the seismic wave parameter set in combination with the source parameter set and/or the target parameter set, to estimate the maximum power value $P_{max}$ of the S wave. The regional power estimation module 322 may be configured to be the same as the power estimation module 32 of the regional earthquake early warning system, which can use the source parameter set and the site parameter set to estimate the maximum power value $P_{max}$ of the S wave.

Then, the early warning module 33 determines, based on the estimations made by the on-site power estimation module 321 and the regional power estimation module 322 (e.g., based on one of the estimations of the maximum power value $P_{max}$ of the S wave that comes out earlier), whether the maximum power value $P_{max}$ of the S wave is greater than the warning value in step S2, so as to determine whether to transmit the earthquake early warning to the earthquake early warning device 6 in step S3.

In summary, the power estimation module 32 uses the wave data of the P wave, the source parameter set or the site parameter set to estimate the maximum power value of the S wave upon arrival at the target site later than the P wave. Then, the early warning module 33 issues the earthquake early warning to the earthquake early warning device 6 that is located at the target site when the estimated maximum power value of the S wave is greater than the warning value. As a result, appropriate earthquake-proof and other protective operations may have a chance of being applied to objects (e.g., buildings and/or high-tech equipment) at the target site before the arrival of the S wave, so as to reduce seismic damages.

In the description above, for the purposes of explanation, numerous specific details have been set forth in order to provide a thorough understanding of the embodiment(s). It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects, and that one or more features or specific details from one embodiment may be practiced together with one or more features or specific details from another embodiment, where appropriate, in the practice of the disclosure.

While the disclosure has been described in connection with what is (are) considered the exemplary embodiment(s), it is understood that this disclosure is not limited to the disclosed embodiment(s) but is intended to cover various arrangements included within the spirit and scope of the broadest interpretation so as to encompass all such modifications and equivalent arrangements.

What is claimed is:

1. A high-power seismic wave early warning method, comprising steps of:

A) by a power estimation module of a high-power seismic wave early warning system, based on at least one of a seismic wave parameter set that is acquired from a first seismic wave of an earthquake detected at an earthquake detection spot, a source parameter set that is related to the earthquake, or a site parameter set that is related to a target site, estimating a maximum power value of a second seismic wave that will arrive at the target site later than the first seismic wave, wherein the first seismic wave is an earliest one of multiple seismic waves of the earthquake that has arrived at the earthquake detection spot; the seismic wave parameter set includes one of a peak displacement value and a peak power value in first N seconds of the first seismic wave, where N≥1; the source parameter set includes a magnitude scale of the earthquake and a depth of a hypocenter of the earthquake; and the site parameter set includes one of a target-site location, shear wave velocity profile data of a soil layer at the target site, and microtremor horizontal-to-vertical (H/V) spectral ratio data at the target site, where the target-site location is represented using a longitude and a latitude of the target site; and B) by an early warning module of the high-power seismic wave early warning system, generating and transmitting an earthquake early warning to an earthquake early warning device that is located at the target site upon determining that the maximum power value of the second seismic wave thus estimated is greater than a warning value.

2. The high-power seismic wave early warning method of claim 1, wherein the seismic wave parameter set further includes one of a main period in the first N seconds of the first seismic wave and a Fourier amplitude spectrum (FAS) of an acceleration in the first N seconds of the first seismic wave, which is acquired by a signal processing module of the high-power seismic wave early warning system performing signal processing on wave data of the first seismic wave; and wherein said one of the peak displacement value and the peak power value in the first N seconds of the first seismic wave is acquired by the signal processing module performing signal processing on the wave data of the first seismic wave.

3. The high-power seismic wave early warning method of claim 2, wherein the target site is the earthquake detection spot, and the high-power seismic wave early warning system is an on-site earthquake early warning system that is located at the earthquake detection spot, and that receives the wave data of the first seismic wave from a seismometer located at the earthquake detection spot;

wherein, in step A), the maximum power value of the second seismic wave is estimated based on the seismic wave parameter set that is acquired from the first N seconds of the first seismic wave.

4. The high-power seismic wave early warning method of claim 3, wherein, in step A), the maximum power value of the second seismic wave is estimated based on the seismic wave parameter set and the site parameter set.

5. The high-power seismic wave early warning method of claim 2, wherein the main period in the first N seconds of the first seismic wave is calculated by the signal processing module based on a ground displacement time history resulting from the earthquake, a ground velocity time history resulting from the earthquake, and a time the first seismic wave arrived at the earthquake detection spot.

6. The high-power seismic wave early warning method of claim 1, wherein the high-power seismic wave early warning system is a regional earthquake early warning system that stores the site parameter set; and wherein, in step A), the maximum power value of the second seismic wave is estimated based on the source parameter set and the site parameter set.

7. The high-power seismic wave early warning method of claim 6, wherein, in step A), the maximum power value of the second seismic wave is estimated based on the source parameter set, the target-site location, and one of the shear wave velocity profile data and the microtremor H/V spectral ratio data.

8. A non-transitory computer-readable storage medium, storing program instructions that, when executed by a computer device of an earthquake early warning system, cause the earthquake early warning system to perform the high-power seismic wave early warning method of claim 1.

9. A high-power seismic wave early warning system, comprising:

a communication interface configured to communicate with an earthquake early warning device that is located at a target site, and to receive one of wave data of a first seismic wave of an earthquake that is detected at an earthquake detection spot and a source parameter set that is related to the earthquake, wherein the first seismic wave is an earliest one of multiple seismic waves of the earthquake that has arrived at the earthquake detection spot, and the source parameter set includes a magnitude scale of the earthquake and a depth of a hypocenter of the earthquake;

a storage unit storing a site parameter set that is related to the target site, and that includes one of a target-site location, shear wave velocity profile data of a soil layer at the target site, and microtremor horizontal-to-vertical (H/V) spectral ratio data at the target site, where the target-site location is represented using a longitude and a latitude of the target site; and a processing unit electrically connected to said communication interface and said storage unit, and configured to acquire a seismic wave parameter set of the first seismic wave upon receipt of the wave data of the first seismic wave, the seismic wave parameter set including one of a peak displacement value and a peak power value in first N seconds of the first seismic wave, where $N \geq 1$;

wherein said processing unit includes:

a power estimation module configured to, based on at least one of the seismic wave parameter set, the source parameter set and the site parameter set, estimate a maximum power value of a second seismic wave that will arrive at the target site later than the first seismic wave; and an early warning module configured to generate and transmit an earthquake early warning to the earthquake early warning device that is located at the target site upon determining that the maximum power value of the second seismic wave thus estimated is greater than a warning value.

10. The high-power seismic wave early warning system of claim 9, wherein the seismic wave parameter set further includes one of a main period in the first N seconds of the first seismic wave and a Fourier amplitude spectrum (FAS) of an acceleration in the first N seconds of the first seismic wave;

wherein said processing unit further includes a signal processing module configured to perform signal processing on the wave data of the first seismic wave to acquire said one of the peak displacement value and the peak power value in the first N seconds of the first seismic wave, and said one of the main period in the first N seconds of the first seismic wave and the FAS of the acceleration in the first N seconds of the first seismic wave.

11. The high-power seismic wave early warning system of claim 10, being an on-site earthquake early warning system that is located at the earthquake detection spot, the target site being the earthquake detection spot;

wherein said power estimation module is configured to estimate the maximum power value of the second seismic wave based on the seismic wave parameter set that is acquired from the first N seconds of the first seismic wave.

12. The high-power seismic wave early warning system of claim 11, wherein said power estimation module is configured to estimate the maximum power value of the second seismic wave based on the seismic wave parameter set and the site parameter set.

13. The high-power seismic wave early warning system of claim 10, wherein said signal processing module is configured to calculate the main period in the first N seconds of the first seismic wave based on a ground displacement time history resulting from the earthquake, a ground velocity time history resulting from the earthquake, and a time point the first seismic wave arrived at the earthquake detection spot.

14. The high-power seismic wave early warning system of claim 9, being a regional earthquake early warning system;
wherein said power estimation module is configured to estimate the maximum power value of the second seismic wave based on the source parameter set and the site parameter set.

15. The high-power seismic wave early warning system of claim 14, wherein said power estimation module is configured to estimate the maximum power value of the second seismic wave based on the source parameter set, the target-site location, and one of the shear wave velocity profile data and the microtremor H/V spectral ratio data.

16. The high-power seismic wave early warning system of claim 9, being a hybrid earthquake early warning system that is located at the earthquake detection spot, the target site being the earthquake detection spot;
wherein said power estimation module includes:
an on-site power estimation module configured to estimate the maximum power value of the second seismic wave based on at least the seismic wave parameter set;
a regional power estimation module configured to estimate the maximum power value of the second seismic wave based on the source parameter set and the site parameter set; and
wherein said early warning module is configured to generate and transmit the earthquake early warning to the earthquake early warning device upon determining, based on the estimations made by said on-site power estimation module and said regional power estimation module, that the maximum power value of the second seismic wave is greater than the warning value.

* * * * *

UNITED STATES PATENT AND TRADEMARK OFFICE
CERTIFICATE OF CORRECTION

PATENT NO. : 12,117,573 B2
APPLICATION NO. : 17/809450
DATED : October 15, 2024
INVENTOR(S) : Chou et al.

It is certified that error appears in the above-identified patent and that said Letters Patent is hereby corrected as shown below:

In the Specification

Column 5, Lines 5-10, please delete "$\tau_c N = 2\pi \sqrt{\dfrac{\int_{t_p}^{t_p+N} d_g(t)^2 dt}{\int_{t_p}^{t_p+N} v_g(t)^2 dt}}$" and replace with $\tau_c N = 2\pi \sqrt{\dfrac{\int_{t_p}^{t_p+N} d_g(t)^2 dt}{\int_{t_p}^{t_p+N} v_g(t)^2 dt}}$ Column 6, Lines 40-45, should read:

$$\Delta_{xx_j} = \sqrt{\dfrac{\sum_{k=1}^{n_f} \{\ln(HVR_k) - \ln(HVR_{j,k})\}^2}{n_f}}$$

Signed and Sealed this
Eighteenth Day of February, 2025

Coke Morgan Stewart
*Acting Director of the United States Patent and Trademark Office*

Column 7, Lines 60-63, should read:

$\ln P_{max} = c_1 \ln P_p N + c_2 \ln \tau_c N + c_3(\mathbf{P}_{fs} N) + c_3 \ln V_{s30} + c_4$ $\ln P_{max} = c_1 \ln P_d N + c_2 \ln \tau_c N + c_3(\mathbf{P}_{fs} N) + c_3 \ln V_{s30} + c_4$